(12) United States Patent
Li

(10) Patent No.: US 10,847,159 B1
(45) Date of Patent: Nov. 24, 2020

(54) PRESENTING LOCATION RELATED INFORMATION AND IMPLEMENTING A TASK BASED ON GAZE, GESTURE, AND VOICE DETECTION

(71) Applicant: Chian Chiu Li, Fremont, CA (US)

(72) Inventor: Chian Chiu Li, Fremont, CA (US)

( * ) Notice: Subject to any disclaimer, the term of this patent is extended or adjusted under 35 U.S.C. 154(b) by 0 days.

(21) Appl. No.: 16/709,942

(22) Filed: Dec. 11, 2019

Related U.S. Application Data

(63) Continuation-in-part of application No. 16/401,094, filed on May 1, 2019, now Pat. No. 10,540,015.

(51) Int. Cl.
| | |
|---|---|
| *G06F 3/01* | (2006.01) |
| *G10L 15/22* | (2006.01) |
| *G10L 15/26* | (2006.01) |
| *G06F 3/041* | (2006.01) |
| *G06F 3/16* | (2006.01) |

(52) U.S. Cl.
CPC .............. *G10L 15/22* (2013.01); *G06F 3/017* (2013.01); *G06F 3/0412* (2013.01); *G06F 3/0416* (2013.01); *G06F 3/167* (2013.01); *G10L 15/265* (2013.01)

(58) Field of Classification Search
USPC .................................................. 345/156, 690
See application file for complete search history.

(56) References Cited

U.S. PATENT DOCUMENTS

| | | |
|---|---|---|
| 9,423,870 B2 | 8/2016 | Teller et al. |
| 2007/0024579 A1 | 2/2007 | Rosenberg |
| 2014/0337740 A1 | 11/2014 | Kwon et al. |
| 2015/0130716 A1 | 5/2015 | Sridharan et al. |
| 2016/0217794 A1 | 7/2016 | Imoto et al. |
| 2017/0351367 A1 | 12/2017 | Popovich et al. |
| 2018/0285065 A1 | 10/2018 | Jeong |

*Primary Examiner* — Tony O Davis

(57) ABSTRACT

Systems and methods for presenting information and executing a task. In an aspect, when a user gazes at a display of a standby device, location related information is presented. In another aspect, when a user utters a voice command and gazes at a device, a task is executed. In some aspects, device names and/or gestures are detected and utilized for implementing tasks. In some other aspects, a voice input, a gesture, and/or user information is used to determine a user command inside an autonomous vehicle.

20 Claims, 6 Drawing Sheets

Step 1: Sensor finds smartphone 38 at store A. Facility sends phone 38 location-based signal.
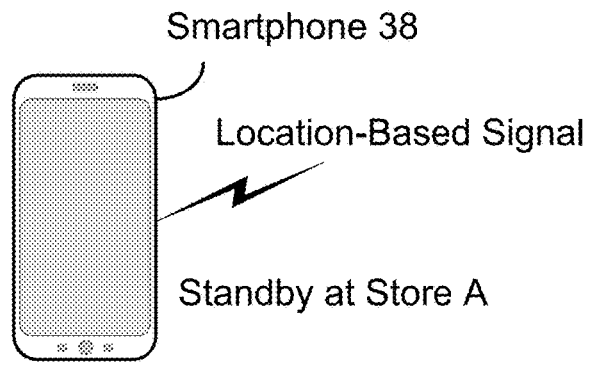
Step 2: User shakes it.
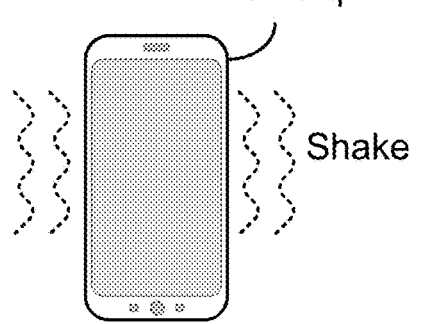
Step 3: User looks at screen.
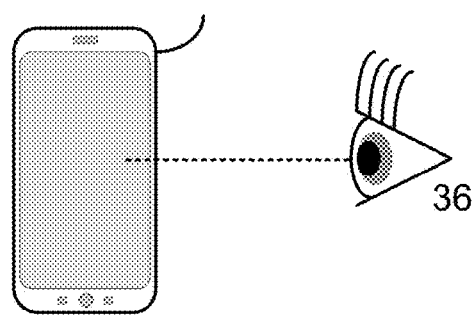
Step 4: Store ads and coupon show up.
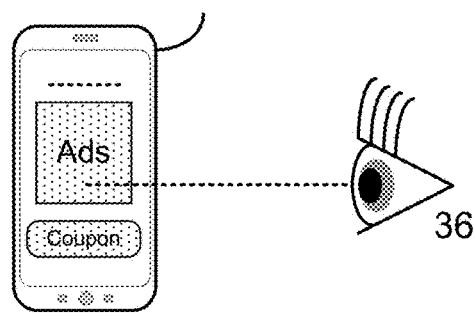
FIG. 4

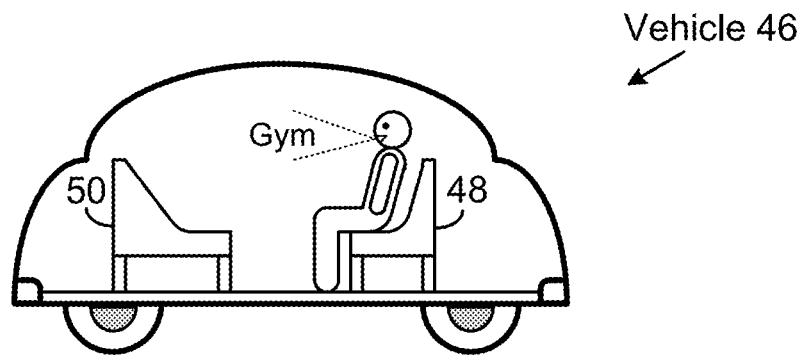
FIG. 8-A
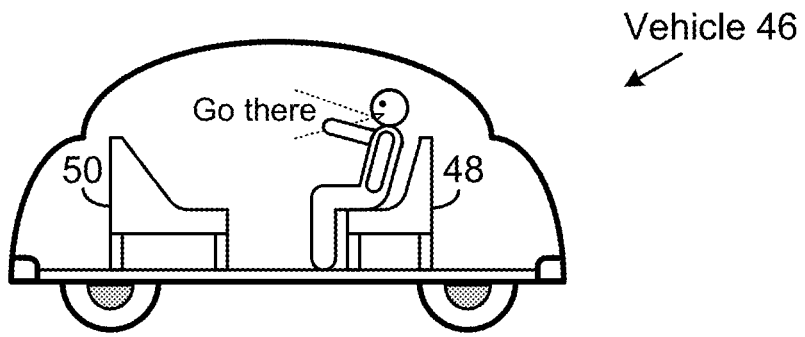
FIG. 8-B
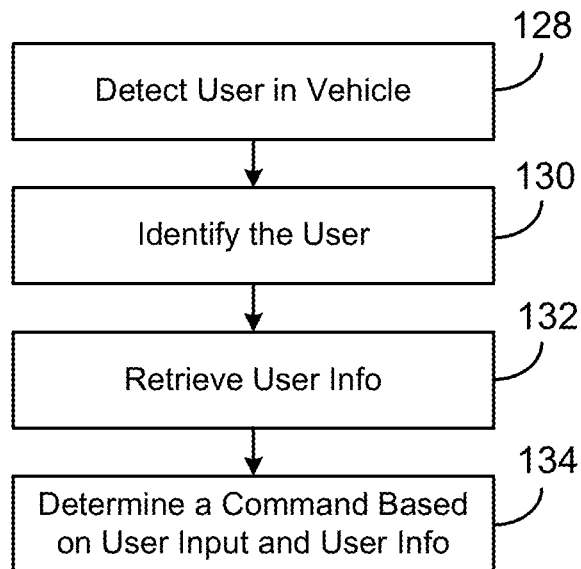
FIG. 9

PRESENTING LOCATION RELATED INFORMATION AND IMPLEMENTING A TASK BASED ON GAZE, GESTURE, AND VOICE DETECTION

CROSS REFERENCE TO RELATED APPLICATION

This is a continuation-in-part of U.S. patent application Ser. No. 16/401,094, filed May 1, 2019, which is a continuation-in-part of U.S. patent application Ser. No. 15/936,418, filed Mar. 26, 2018, which is a continuation-in-part of U.S. patent application Ser. No. 15/723,082, filed Oct. 2, 2017, which is a continuation of U.S. patent application Ser. No. 15/674,525, filed Aug. 11, 2017, which is a continuation-in-part of U.S. patent application Ser. No. 15/397,726, filed Jan. 3, 2017, which is a continuation-in-part of U.S. patent application Ser. No. 14/525,194, filed Oct. 27, 2014, now U.S. Pat. No. 9,619,022, granted Apr. 11, 2017.

FEDERALLY SPONSORED RESEARCH

Not applicable

SEQUENCE LISTING OR PROGRAM

Not applicable

BACKGROUND

Field of Invention

This invention relates to presenting information or executing a task, more particularly to presenting information or executing a task after detecting gaze, gesture, and voice input from a user.

Description of Prior Art

Many portable electronic devices have become ubiquitous, as an indispensible part of our daily life. Examples include smartphones, tablet computers, and potentially, smart watches and other wearable gadgets. These devices, especially smartphones, may be used to transmit to users and then present information such as an advertisement prepared for consumers, a notice and info for event attendees, class messages for students, or flight info for passengers. But many a time, it is not easy to acquire contact info on people involved and to figure out when to present. For instance, most ads are delivered to people indiscriminately, blindly, and without specific consideration on timing, which compromises the effectiveness of ads.

To make ads more relevant and acceptable, location-based advertising has been advocated. For instance, people visiting a store have a better chance to become a customer than people elsewhere. So a store manager may be more interested in sending ads to people present at the store than people at home. The same is true for delivery of information other than advertisements. For example, event attendees are more willing to read event material when they are in there, students are more likely to read class messages when at school, and passengers are more eager to learn flight and gate status when at the airport. Moreover, it's relatively straightforward to send location related information, since devices on the scene are the obvious target, and it may start sending messages right after users arrive at a location or come near a location. As a result, it's likely that the right info is sent to the right people in the right place at the right time. But then, the next issue may be how to present it in such a way that it is easy, simple, and convenient for a user to access. If relevant info is transmitted via email, a method used quite often nowadays, people may have to go through several steps to log in an email account, open a mail, and then take a look at it. If viewing info requires an app, people have to find the app among other apps installed at a device and then launch it. Either way, it is not convenient enough to look for info transmitted from a network or service to a device. On the other hand, if a device is on, and a window pops up by itself, it may become annoying; and if a device is in standby mode with a dark screen, it is inappropriate to lighten up its display to show any content without user consent. Thus presenting info on a device automatically has its own limitations.

Therefore, there exists a need to present location related information in a simple, easy, and convenient way.

When a user wants to do a task, the user may say to a device certain words as a voice command and the device may execute the task after obtaining the command via voice recognition. However, voice commands alone often make the process awkward, boring, and less natural. For instance, if a device is called "ABW", a user may say "ABW, switch to channel 9", "ABW, go to channel 11", and repeat uttering "ABW" too many times.

Therefore, there exists a need to issue a voice command in a simple, convenient, and natural way.

After a user gets in an autonomous vehicle, the user may say an address or a name of a place as the destination. However, uttering an address or a formal name for every ride may become annoying.

Therefore, there exists a need to determine a user command, which is simple, convenient, and natural, inside an autonomous vehicle.

Objects and Advantages

Accordingly, several main objects and advantages of the present invention are:

a). to provide improved methods and systems to present location related information or implement a task;

b). to provide such methods and systems which start a presentation when a user gazes at a device;

c). to provide such methods and systems which start a presentation when a user shakes a device and then gazes at it;

d). to provide such methods and systems which implement a task when a user utters a command and gazes at a device;

e). to provide such methods and systems which implement a task when a user either utters a device name or gazes at it;

f). to provide such methods and systems which implement a task based upon detection on a voice input, a gaze, and/or a gesture; and g). to provide such methods and systems which determine a destination of an autonomous vehicle based on a voice input, a gesture, and/or information about a user in records.

Further objects and advantages will become apparent from a consideration of the drawings and ensuing description.

SUMMARY

In accordance with the present invention, methods and systems are proposed to present location related information and implement a task. After a user arrives at a place, the user may just look at a device screen to start an info presentation by gaze. The user may also shake a device to trigger gaze detection, and then watch it to bring out a presentation. In addition, the user may speak to a device and then gaze at it to invoke a presentation. To do a task, a user may utter a command and gaze at a device. The user has options to say a device name or not to mention it. Moreover, the user may use gaze and gestures to address two devices and execute a task. Additionally, a command for an autonomous vehicle may be determined based on a voice input, a gesture, and/or user information in records.

DRAWING FIGURES

FIG. 4 uses graphic diagrams to show yet another embodiment of information presentation in accordance with the present invention.

Figure 5:
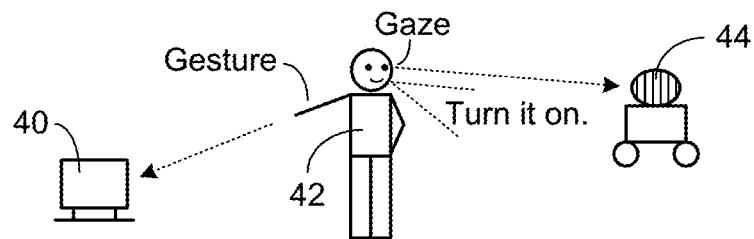

FIG. 5 is an exemplary diagram which shows a voice command along with gaze and gesture input in accordance with the present invention.

Figure 6:
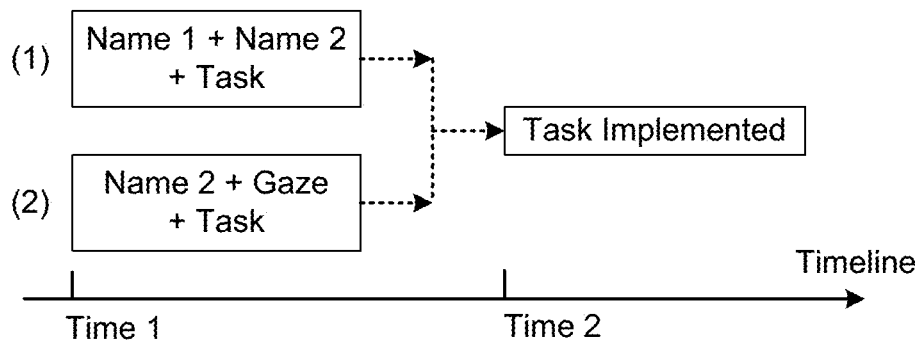
Figure 7:
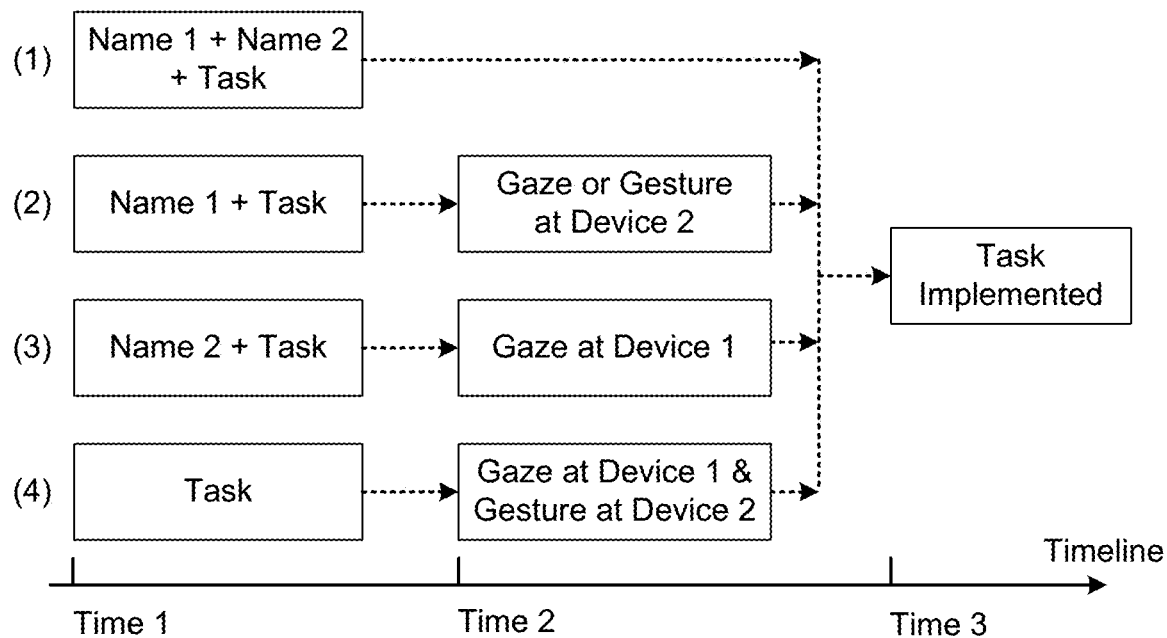

FIGS. 6 and 7 are diagrams which illustrate exemplary processes along a timeline in accordance with the present invention.

FIG. 8-A is an exemplary diagram which illustrates a user issues a voice command in a vehicle in accordance with the present invention.

FIG. 8-B is an exemplary diagram which illustrates a user generates a voice input and a gesture input in a vehicle in accordance with the present invention.

FIG. 9 is an exemplary flow diagram showing an embodiment of determining user commands in accordance with the present invention.

Figure 10:
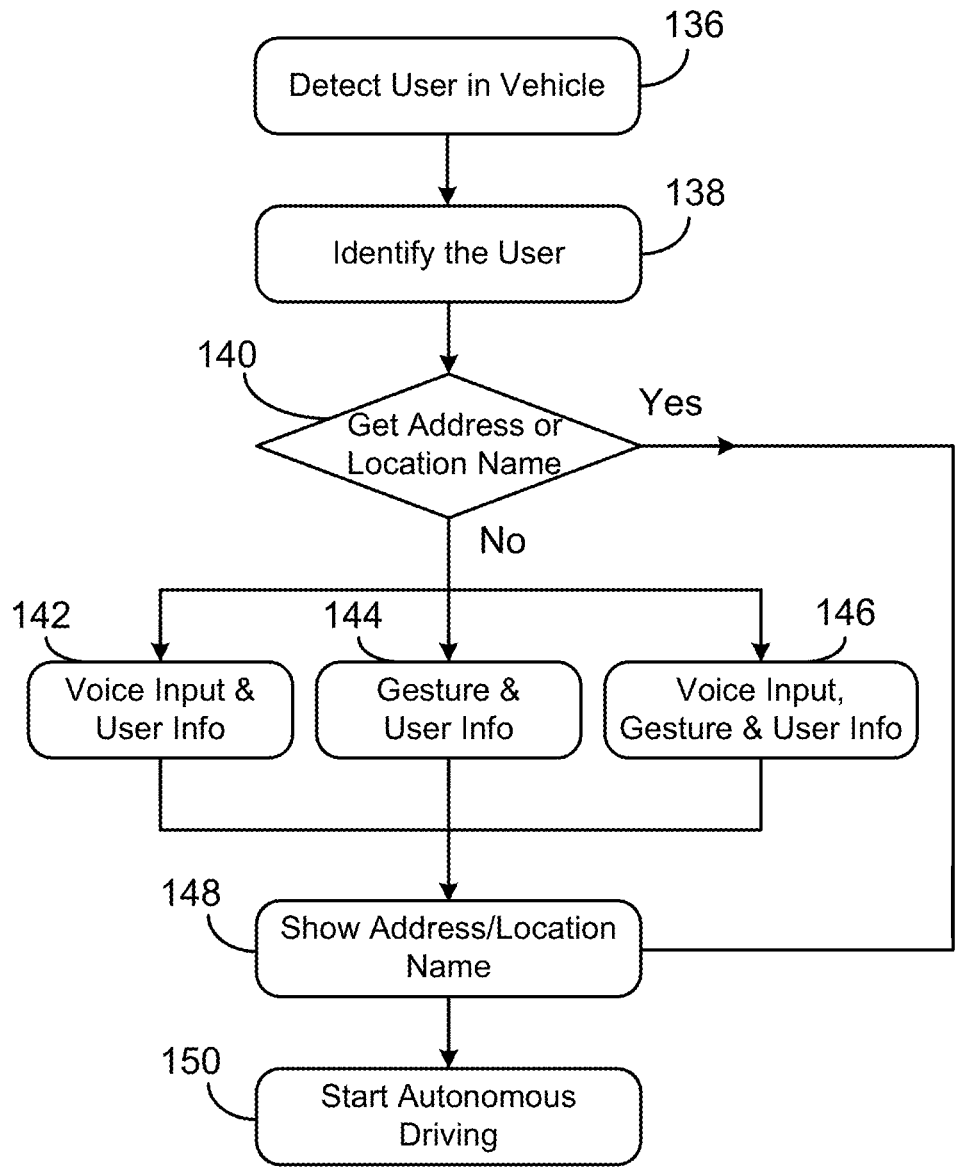

FIG. 10 is an exemplary flow diagram showing another embodiment of determining user commands in accordance with the present invention.

| REFERENCE NUMERALS IN DRAWINGS | | | |
|---|---|---|---|
| 10 | Sensor | 12 | Device |
| 14 | Processor | 16 | Computer Readable Medium |
| 18 | Sensor | 20 | Sensor |
| 22 | Sensor | 36 | Eye |
| 38 | Smartphone | 40 | Device |
| 42 | User | 44 | Device |
| 100, 102, 104, 106, 108, 110, 112, 114, 116, 118, 120, 122, 124, and 126 are exemplary steps. | | | |

DETAILED DESCRIPTION

The following exemplary embodiments are provided for complete disclosure of the present invention and to fully inform the scope of the present invention to those skilled in the art, and the present invention is not limited to the schematic embodiments disclosed, but can be implemented in various types.

Figure 1:
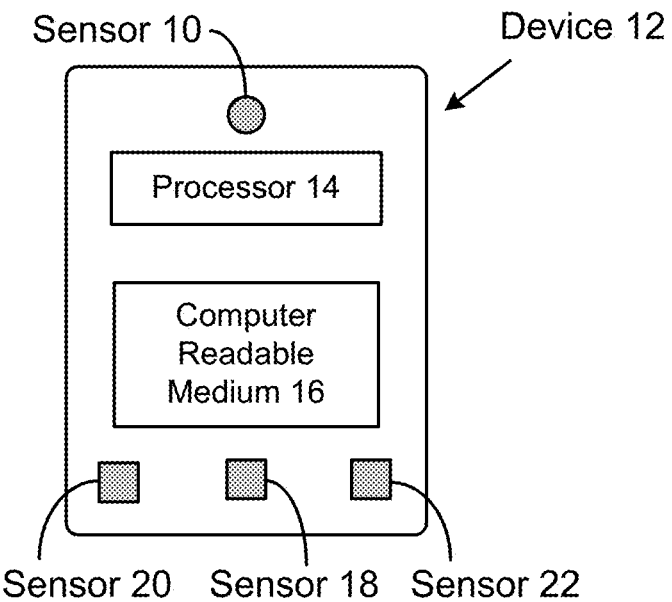
FIG. 1 is an exemplary block diagram describing one embodiment in accordance with the present invention.

FIG. 1 is an illustrative block diagram of one embodiment according to the present invention. A device 12 may represent an electronic device, including but not limited to mobile phone, smart phone, smart watch, wearable device, handheld computer, tablet computer, and the like. Device 12 may include a processor 14 and computer readable medium 16. Processor 14 may mean one or more processor chips or systems. Medium 16 may include a memory hierarchy built by one or more memory chips or storage modules like RAM, ROM, FLASH, magnetic, optical and/or thermal storage devices. Processor 14 may run programs or sets of executable instructions stored in medium 16 for performing various functions and tasks, e.g., surfing on the Internet, playing video or music, gaming, electronic payment, social networking, sending and receiving emails, messages, files, and data, executing other applications, etc. Device 12 may also include input, output, and communication components, which may be individual modules or integrated with processor 14. The communication components may connect the device to another device or a communication network. Usually, Device 12 may have a display (not shown in FIG. 1 for brevity reason) and a graphical user interface (GUI). A display may have liquid crystal display (LCD) screen, organic light emitting diode (OLED) screen (including active matrix OLED (AMOLED) screen), or LED screen. A screen surface may be sensitive to touches, i.e., sensitive to haptic and/or tactile contact with a user, especially in the case of smart phone, smart watch, and tablet computer. A touch screen may be used as a convenient tool for a user to enter input and interact with a system. Furthermore, device 12 may also have a voice recognition system for receiving verbal commands or audio input from a user.

A communication network which device 12 may be connected to may cover a range of entities such as the Internet or the World Wide Web, a local area network (LAN), a wide area network (WAN), a metropolitan area network (MAN), a telephone network, an intranet, wireless, and other types of networks. Device 12 may be connected to a network by various wired, wireless, optical, infrared, ultrasonic or other communication means.

Device 12 may also include a sensor 10 which tracks the eye movement or gazing direction of a user using mature eye-tracking or gaze detection technologies. The sensor may be arranged on the top surface of a device, or close to a display screen, and may be designed to have imaging capability. With imaging functions, a system may recognize whether an eye is in such a state that the eye sight falls on the body of device 12 using certain algorithm, in other words, sensor 10 may be employed to determine whether a user is looking at the body or the screen of a device. Once it senses that a user is gazing or looking at a given target, it may record the starting time, and then the total gazing or watching time. Only when the gazing or watching time exceeds certain value, for instance a few seconds, it may be declared that a user is gazing or looking at a target. As a consequence, a very brief look may be too short to qualify as a gazing or watching act. In the following sections, it is assumed the total gazing time of each case satisfies a minimum value requirement when it is said a gazing act is detected.

Sensor 10 may be built using mature imaging technologies, such as technologies for making camera modules which are used in almost every smartphone, and an image of a user's eye may be analyzed with mature algorithm to decide which direction the user is looking at. Both visible and infrared light may be employed for eye tracking. In the latter case, an infrared light source may be arranged to provide a probing beam. In addition, sensor 10 may also employ other suitable technologies which are capable and affordable other than the eye-analysis scheme discussed to determine a gazing or watching direction of a user. In some applications, when the accuracy of gazing direction is not critical, such as when a gaze target is a screen, not a small area of the screen, a watching direction may be obtained via analyzing facial pictures of a user.

Device 12 may also include a sensor 20 which functions as a proximity detector, which is well known in the art and well developed too. Sensor 20 may be used to detect an object outside the device and may have multiple sensing units. It may include a camera-like system to obtain visible images or infrared images and then recognize any movement through image analysis over a period of time. It may also have capability to sense whether device 12 is close to a user's body or whether it is held by a hand. Detection result may be used to determine an environment where a user is in, or the intention of a user. For instance, a user may want to look at a device anytime when he is holding it on hand.

Moreover, device 12 may contain a sensor 18 to detect its own movement by sensing acceleration, deceleration, and rotation, which may be measured by accelerometers and gyroscopes. Accelerometers and gyroscopes are already mass produced using semiconductor technologies. They are widely used in smartphones and other personal gadgets. Using measurement data obtained by sensor 18, it can be determined whether device 12 is moved to the left, right, forward, or backward, and at what speed, whether it is rotated clockwise or anticlockwise along which axis, and whether it is tilted to the left, right, forward, or backward. The data may also be used to detect whether a device is moved back and forth as a result of shaking. In some embodiments in the following, device shaking, as a user input, is one state to be detected. Word "shake" or "shaking" may be interpreted here as moving a device horizontally or vertically, rotating along any axis, or any other patterns of back and forth movement. A shaking act may be detected based on predefined movement profiles or movement conditions of a device. Furthermore, sensor 18 may be used to detect vibration of device 12. Thus, knocking or tapping on a device body may be utilized as a user input too, because it generates detectable vibration signals.

Inside device 12, output signals of sensors and detectors are transmitted to processor 14, which, employed with certain algorithm, may process the data and produce subsequent command instructions according to certain programs or applications. The instructions may include presenting location related info on a screen.

In addition, device 12 may carry a positioning sensor (not shown in FIG. 1 for brevity reasons) and a magnetic sensor 22 as an electronic compass. A positioning sensor may be a global positioning system (GPS), which enables a device to get its own location info. Device position may also be obtained using wireless triangulation methods, or a system employing other suitable technologies, while both may be performed by a service provider or service facility. Sensor 22 measures the earth magnetic field along least two orthogonal axes X and Y. It may be used to determine device orientation, such as which direction a device is pointing at, assuming the device is placed in a horizontal or vertical position. When a device's location is known, service center (i.e., a service facility) may send to the device location-based information, i.e., info related to the location or nearby places. In the case of location-based advertising, a user may receive commercials after he or she is at a business or close to a business. On the other hand, when the pointing direction of device is known, space around a user may be divided into sections. With the knowledge of a device's location and pointing direction, a segment of map area which corresponds to where a device is pointing at may be generated. The segment may match a user's interest, and thus information from this segment may be more relevant than info from other areas. Meanwhile, sorting by segment may make information easier to view for users, since contents presented on screen are reduced.

Figure 2:
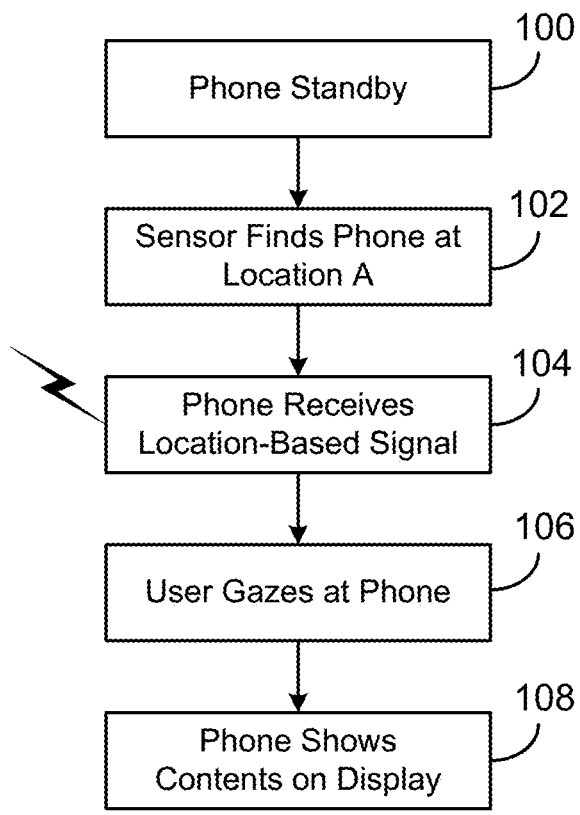
FIG. 2 is an exemplary flow diagram showing one embodiment of presenting location related information in accordance with the present invention.

FIG. 2 is a schematic flow diagram showing one embodiment of presenting location related information. Take smartphone for example. Assume a smartphone is in standby mode in Step 100. When a user with the phone enters Location A, a system sensor may detect it in Step 102. For instance, when a phone arrives at a place, a service provider may sense it or a local sensor may detect it using mature positioning technologies. Assume there is information available which is related to Location A. In Step 104, a location-based signal is transmitted to the phone and the phone receives it. The signal may come from a remote center or a nearby facility. Once the phone gets the signal, it starts sensing the user's gaze direction. When not triggered, gaze detection function may be in off state to conserve power. In Step 106, the user gazes at the phone screen, which may be sensed by a gaze sensor like sensor 10 of FIG. 1. Here a user's gaze act may work as the user's approval for presenting information. In Step 108, the phone displays contents related to Location A.

After arriving at a location, a user may become more likely to view information related to the place. The user just needs to look at a phone screen, info would appear automatically. The info presentation process is easy, simple and convenient. It may be used by teachers to distribute class notes, which may be accessed by students at one classroom only, by store managers to send advertisement to people at or close to his or her store only, or by organizers to send on-site event participants info about the event. Usually for indoor or some urban environment, positioning methods other than GPS are used, since GPS requires a clear view of the sky or clear line of sight for four GPS satellites.

The scheme described in FIG. 2 provides a simple and practical way to arrange location related information. But when lot of such information is available, it makes things a little complicated. For instance, in a shopping mall area, there may be many stores and shops around. As a consequence, a user may find it time consuming to get needed info. Thus a quick and convenient sorting method is desirable. For this issue, following discussion gives a solution.

Figure 3:
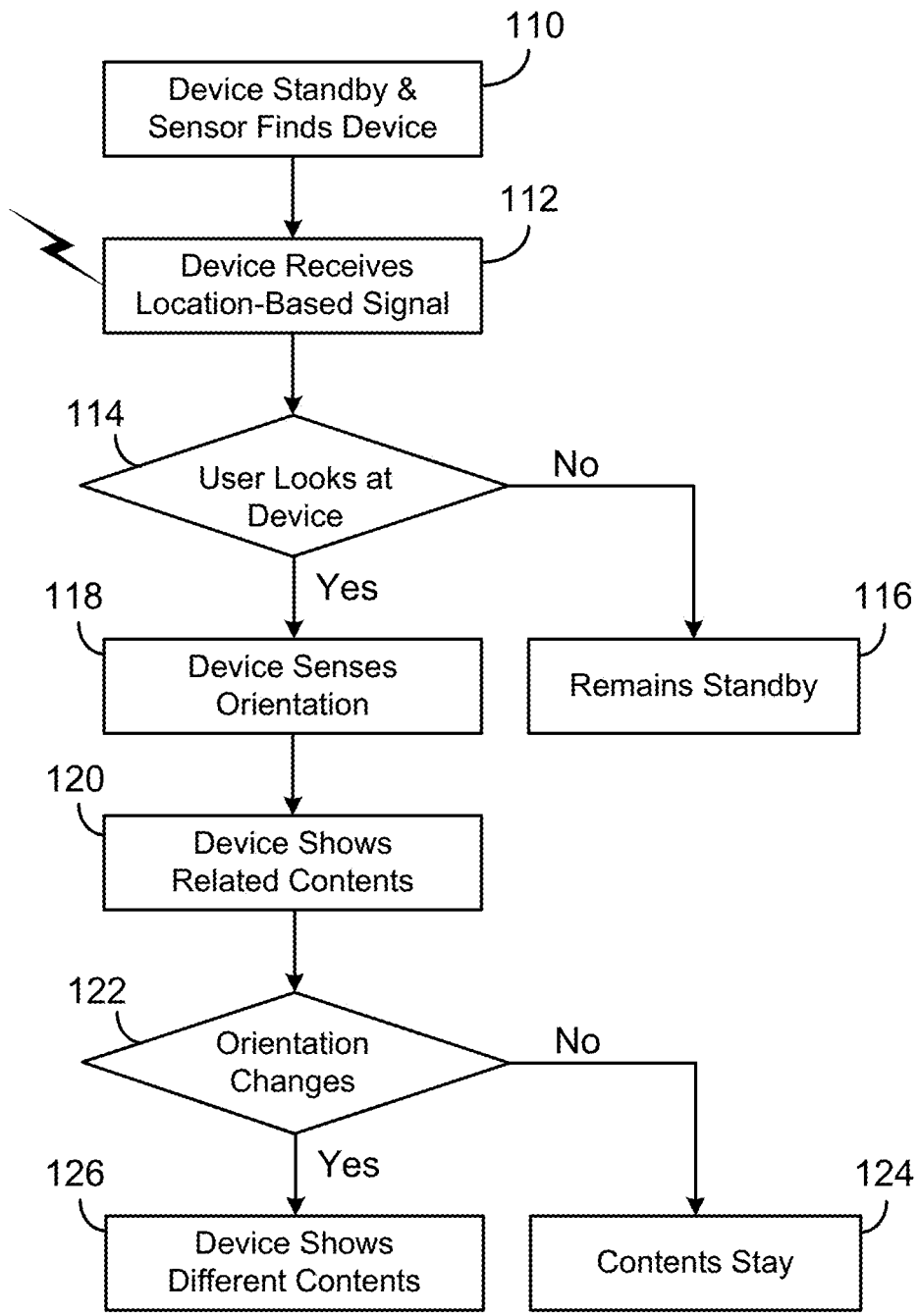
FIG. 3 is an exemplary flow diagram showing another embodiment of presenting location-based information in accordance with the present invention.

FIG. 3 shows another schematic flow diagram of presenting location related information. Assume a device is on standby and is detected at a place in Step 110. Next in Step 112, the device receives a signal which contains location related information through wireless technologies. Then, a gaze sensor is activated and begins to sense the gaze direction of a user. The gaze sensor may be arranged always on if power conservation is not an issue and the user consents. In Step 114, the gaze sensor detects whether the user looks at the device. If the user looks elsewhere, the device may remain its standby state in Step 116. When the user ends the standby state later on, a temporary icon may appear on screen. The icon may represent information related to the location. Once the icon is tapped or clicked, location related info may be presented. A temporary icon may also be generated on screen for later use when a user is busy engaging with an app at the moment of receiving location related information. Such icon provides another opportunity to present temporarily stored location related contents. Back to the figure, if it is detected that the user looks at the device for a given period of time, the device may start to detect its orientation using a magnetometer component like sensor 22 of FIG. 1, as shown in Step 118. In the meantime, the device may acquire its position status, i.e., its location. Location data may be obtained via the device's own sensor or an outside sensing system. Once info about location and orientation is known, the device may start presentation of related information in Step 120. The related information is of info associated with the pointing direction of the device. For instance, with the knowledge of location and orientation and certain algorithm, a device may provide a list of businesses which are located between its place and somewhere far away along its pointing direction. The list of businesses may be in a text format or shown on a map segment. A map segment is part of a map with an elongated shape along a device pointing direction. A map segment may be obtained by cutting off some parts of a map and leaving only an elongated segment. Thus a pointing act may be used as a sorting tool, and a device may be designed to show information related to or around a pointing direction only. Besides businesses and organizational entities, pointing direction of a device may also be used to get info on products. For instance, a user may point a device at one section of a store to get prearranged info about that area, such as coupons and items on sale in that direction.

A device may be in a horizontal position, or vertical position. Take smartphone for instance. If a phone is in horizontal position, with its display screen being horizontal and parallel to the ground, a pointing direction is what its front end points outwards in a horizontal plane. For a phone in vertical position, a pointing direction is what its back points at or its camera points at, which is the opposite direction of what its screen faces.

As orientation data may be obtained fast through an electronic compass, a pointing act may lead to real-time info scanning. In Step 122, device orientation is measured again. If there is no change, content items on display may remain in Step 124. If there is a change, meaning the device is rotated to point at a new direction, another set of content items may be presented in response in Step 126. For example, when a user rotates a smartphone horizontally along a vertical axis, it may work like scanning with a probing beam. It may be designed such that during scanning, only information related to a business which is straight ahead will show up on screen. Thus a user may slowly rotate a device, e.g., a smartphone, to view info at each direction, or point a device at a selected business to access info about that business directly.

FIG. 4 uses graphic diagrams to show another embodiment of presenting location related information. Again, a smartphone is used in a retail setting. It starts with Step 1 when a positioning sensor finds a smartphone 38 at store A. The phone is in standby mode and has a dark screen. A service facility sends the phone a signal, and the phone receives location related information. Unlike the previous embodiment, a gaze sensor of the device is not triggered by the location-based signal, but by a user's physical act like shaking or tapping the device. In Step 2, the user shakes phone 38, which is picked up by the phone immediately, e.g., within seconds. Then the control system of phone 38, like processor 14 of FIG. 1, sends a signal to the gaze sensor. The gaze sensor starts sensing the user to determine whether he or she looks at the phone screen. If it is detected that eye 36 is watching the phone screen for a predetermined period of time in Step 3, the device may begin presenting store advertisements and coupons in Step 4.

In above discussions, a user needs to do two things, shaking a phone lightly and watching its screen briefly, and then certain info will be displayed. The scheme brings several merits. A user may have more control over what time to show location related information. It may reduce chances of showing unwanted info by an accidental gaze at a device. In addition, as a shaking act reflects a user's desire for certain content, it may help satisfy the user and help content owners like merchants in the meantime.

Furthermore, a user may speak to a device to turn on a gaze sensor using voice recognition techniques. For instance, a user may say to a device "Start" or "Show info" and then look at it to invoke a location related presentation. Benefits of using gaze detection and voice recognition together include precision, convenience, multiple choices, and complex instructions. Without gaze detection, unwanted presentations may occur in response to irrelevant voice signals and multiple devices may react to one voice command. Without voice recognition, gazing may invoke a single and often simple task only, which may limit applications. By uttering a command and a gaze act, a user may not only start a location related presentation on a device, but also make the device execute a task among predefined assignments.

When voice recognition and gaze detection are used together, two scenarios may be created: A user may say certain word or words and then look at a device or look at a device and then say certain word or words. The two actions, i.e., speaking and gazing, in both scenarios may be arranged to cause a device to carry out one or more tasks. As aforementioned, when it is detected that a user looks at or gazes at a device, it means the user looks at or gazes at it for at least a given time. The tasks may include presenting certain content items, turning on a device from a standby or power-off state, switching from one working state to another one, implementing one or more tasks specified in a voice input, and performing other given tasks. For brevity purpose, only one or two tasks are cited when discussing voice-related examples below, where other tasks may be applied without mentioning. Content items presented using or at a device may be related to a location, scheduled by a user, arranged by a remote facility or service center, or specified in a voice input. The content items may have video, audio, or other formats and may be subscribed with fees or sponsored by an entity. A device may present content items using a display, a speaker, or other output components. Initially, the device may be at a standby, sleeping, power-off, or power-on state. In some applications, whether or not a user gazes at a device may be detected. In other applications, whether or not a user gazes at a device's display, speaker, or another output component may be detected. For brevity reasons, only the former case, i.e., gazing at a device, is mentioned in discussions below.

In the first scenario, a voice recognition system is on and monitoring a user's voice message from the beginning. For instance, the system may be arranged in an operational mode to collect and analyze a user's voice message continuously. After the system receives a voice input, it analyzes and interprets the input using certain algorithm and ascertains whether the input matches or contains one of prearranged voice commands. A single word or sentence such as "Start", "Turn on", a program name, or a device name may mean a command to start a presentation or turn on a device. Once it is detected that a user issues a voice command, the user's gaze direction is checked. A gaze sensor may be in a working state all the time. Alternatively, the gaze sensor may also be triggered to wake up from a sleeping or standby state by a signal which may be triggered by the voice recognition system after the system receives an input. When it is concluded that a user gazes at a device within a given short time period, like five to ten seconds, after a voice command is received, the command is implemented at the device. If a device cannot ascertain that a user gazes at it, the device may ignore a voice command which it received a short while ago. The gaze requirement enables targeting a device with precision, which may be especially useful when multiple devices which all have voice recognition capabilities are present.

In the second scenario, a gaze sensor is on and monitors a user's gaze direction continuously. A voice recognition system may remain active and ready to take a voice input all the time. As another option, a voice recognition system may be on standby and only wake up when a gazing act happens. For instance, after it is detected that a user gazes at a direction towards a device, a signal may be generated to turn on a voice recognition system at the device and optionally, the device may turn on a lighted sign with a word like "Ready". The sign may work as an invitation to ask for voice instructions from a user. As long as a user looks at the device, the sign may stay lighted there. When it is determined that a user gives a voice command while still looking at the device or within a given time period, say five to ten seconds, after the user finishes a gazing act, the voice command is carried out at the device. If a user gives a voice command without looking at a corresponding device, the voice command may not take effect. Again, gazing and voice command are used together to target a device with precision and initiate a task at the device.

When both a gaze sensor and a voice recognition system are turned on from the beginning, a method may be arranged where either a gazing act or a voice input act may happen first. For instance, it may be configured that if a user says a command and then gazes at a device within a given time, the command may be implemented at the device; if a user says a command and gazes a device at the same time, the command may be implemented at the device; if a user gazes at a device and then says a command while still gazing at the device, the command may be implemented at the device; and if a user gazes at a device and then says a command within a given time after the gazing act ends, the command may be implemented at the device. In other words, assume that a user gazes at a device during a first time period from time-A1 to time-A2 and issues a voice command during a second time period from time-B1 to time-B2. The device may be arranged to implement the command if the two time periods overlap either fully or partially or a gap value between the two time periods along a timeline is smaller than a given value, say five to ten seconds, where it doesn't matter which period happens first. For instance, when time-B1 is later than time-A1 and time-B2 is earlier than time-A2, the two time periods overlap fully. When time-B1 is later than time-A1 but earlier than time-A2 and time-B2 is later than time-A2, the time periods overlap partially. When the two time periods don't overlap, time interval between time-A2 and time-B1 or between time time-B2 and time-A1 is the gap value. It is seen that above descriptions using time periods apply to cases where a gaze sensor or voice recognition system is triggered by a user's verbal or gazing action.

When multiple devices are involved, two methods may be designed. Assume that a user gazes at a first device before issuing a voice command and gazes at a last device immediately after the voice command is issued. Meanwhile, the user may gazes at any device or devices when the user is issuing the command verbally. Then it may be configured that either the first device or the last device may dominate. With the first method, the command may be performed at the first device, regardless of what happens afterwards. With the second method, the command may be carried out at the last device regardless of what happens before.

In above discussions, it is assumed that a device contains a gaze sensor, a voice recognition system, and a presentation component like a display or a speaker. Alternatively, a device may only contain a presentation component and perform presentation function, while gaze sensing and voice recognition may be controlled by a separate on-site or remote control system. For instance, a control system of a museum may monitor a visitor's gaze direction and verbal instructions using gazing and voice sensors. The control system may detect whether the visitor looks at a wall-mount display and says "Open" simultaneously or within a given time period starting from end of the gazing act, or says "Open" and looks at the display simultaneously or within a given time period starting from end of the voice input submission. For instance, the control system may receive and analyze data from the sensors, ascertain a visitor's gaze direction, identify the wall-mount display by the gaze direction, receive a voice input from the visitor, recognize a command from the input by certain algorithm, determine time periods corresponding to the gazing and verbal acts respectively, proceed when the two periods overlap or a gap between the two periods is smaller than a given value, generate a signal, and send out the signal which may cause the display to turn on and show certain contents accordingly.

A device may also have a locating detector to identify a user and measure the position of the user who has just uttered some verbal content. A locating detector may measure and analyze sound waves to determine a source position using mature technologies. The locating detector may also be used to collect voice inputs from a target user only, where the target user may have gazed at a device or may be gazing at the device. Locating a target user becomes critical when multiple users are on site. For instance, a device may be configured to receive and interpret a voice input, identify and locate a user who just gives the voice input using a locating detector, measure the user's gazing direction, and then perform a task extracted from the voice input when the user gazes at the device simultaneously or within a given time period after the voice input is received. Alternatively, a device may also be configured to monitor a user's gaze direction, measure and obtain position data of the user after the user gazes at the device, calculate a target position of sound source of the user, e.g., a position of the user's head or mouth, receive a voice input, ascertain whether the input comes from the target position, analyze the input if it is from the target position, ascertain whether the input contains a command, and then perform a task derived from the command when the input is received while the user is still gazing at the device or within a given time period after end of the gazing act.

It is noted that a user may generate a voice input which may include various simple or complex commands. A simple command may contain a single and simple word to describe a simple task, such as "Start", "Open", or "TV", which may be used to cause a device to start working, like turning on a radio, an air conditioning, or television. A user may also issue a complex command which may contain several sentences to describe one or more tasks having several requirements. For instance a user may say to a control device "Turn on air conditioning, turn on TV, go to Channel Nine," while looking at it.

Since a device may be targeted precisely with mature voice recognition techniques, gaze sensing may not be needed in some cases. For instance, a name may be assigned to a device. When a user says the name and a command, the device may detect its name and take the command. But relying solely on a device name in a voice command has weaknesses. For instance, a user has to remember a name, which has to be unique to avoid duplicating another name. A user has to say the name, which means an extra requirement and extra step. And a user may say a wrong name, which may cause frustration since a command may not be carried out. Thus there exists a need for a method which combines gaze sensing and voice recognition via a new scheme.

When a name is assigned to a device, a voice command may be taken from a user and implemented at the device in several cases. For instance, a device may monitor a user's gaze direction and voice input and carried out a command when one of the conditions or requirements is satisfied without using name of the device. The conditions or requirements may be those which are discussed in the above, e.g., when a gazing and verbal acts occur together. A device may also be configured to recognize its name from a voice input and implement a command without checking gaze direction. For instance, assume that a device is assigned a name "ABW". The device's voice recognition sensor is on. After a user says "ABW, turn on the lights", the device may take the input, recognize its name and the command, and then create a signal to turn on the lights, which is a task derived from the command. But if a wrong name is used, the device may not follow the command. A device may implement a command even when a user says a wrong name if it relies on results of gaze detection. For instance, assume a user says to the device "YW, turn on the lights" while looking at it. If voice recognition is used alone, the device may not react, as the command is addressed to another device. However, with gaze detection, it may be configured that as long as a user gazes at a device while speaking to it, or a user's gazing and verbal acts satisfy one of the conditions or requirements, a command may be implemented even when the user says a wrong name.

To make it more flexible, three options may be provided to a user at the same time: A user may gaze at a device and say a command without mentioning a device name; a user may say a command and mention a correct device name without gazing at it; and a user may gaze at a device, say a command, and mention a device name. The first option represents all cases as discussed where a device name is not involved. The second option may not work if a wrong name is used. The third option is like the first option plus that a user says a device name. In the third option, whether or not a user mentions a correct name becomes irrelevant, since the device is identified by detected gazing direction, not the device name. Therefore, a user may choose to gaze at a device or not to gaze at it, when issuing a voice command to the device. And to be certain, a user may choose to gaze at a device when submitting a voice command.

Accordingly, a device may be configured for a user to use with any of the three options. For instance, a device may keep monitoring a user's voice input and gaze direction via a voice recognition system and a gaze sensor, and ascertain whether a voice input contains a command and whether the user gazes at the device. If the device doesn't detect any command from the user, no task is implemented. If the device detects a voice command, it may ascertain whether a qualified gazing act happens and whether a device name is mentioned which matches a predetermined name or profile. A qualified gazing act may be the one which when combined with the verbal act satisfies one of aforementioned conditions or requirements. If a qualified gazing act is detected, the device starts implementing the command. If a qualified gazing act is not detected, but a correct device name is mentioned, the device starts implementing the command. If a qualified gazing act is not detected, and a correct device name is not mentioned, the device doesn't implement the command.

When multiple devices are involved, an on-site or remote control system may be arranged. The control system may receive, collect, and analyze data sent from gaze sensors and voice sensing detectors of the devices. A voice sensing detector may be designed to detect sound waves. The gaze sensors and voice sensing detectors may be arranged to sense a user continuously. The control system may work in three modes. In the first mode, the control system may carry out a command at a device which a user gazes at and a condition set forth for gazing and verbal acts is met. In the second mode, the control system may carry out a command at a device whose name is mentioned by a user in the command. In the third mode, the control system may carry out a command at a first device which is gazed at by a user or mentioned in the command. When a user gazes at the first device and mentions a name of a second device, the control system may carry out the command either at the first device or the second device depending on set-up selection. It may be arranged that a user may choose a mode or switch from a mode to another one.

When two users speak and give voice commands around the same time, there are several scenarios. Assume that a user may target a device by saying an assigned name or gazing at it. If a user says a name of a device while gazing at another device, it depends on a prearranged setup which a user may change. So a user may decide which prevails when a name and gaze direction are directed to two objects. When a user says a device name, it is assumed that the user also mentions a task in a voice command. When a user gazes at a device, it is assumed that the user also says a task in a voice command. And when it is said a user gazes at a device, the gaze may happen before, after, or simultaneously with a voice command, satisfying one of aforementioned conditions. Without mentioning, locating techniques may be used to determine who said what.

First, assume the two users target the same device (such as speaking to the same device) by a voice command alone or a voice command plus a gaze act within a given short period of time, say a few seconds. If the two give the same task, the task may be implemented. If the two users give different tasks, there are two cases. If the two tasks could be performed simultaneously and respectively, like turning on a light and a television, the two tasks may be carried out at the same time. If the two tasks conflict with each other, like turning on the lights and turning off the lights, a task whose corresponding voice command ends last may prevail. For instance, assume that a device has an assigned name "ABW". If one user says "ABW, turn on the lights" and the other says immediately "ABW, turn off the lights", the device may turn off the lights if it is detected that the latter voice instructions end at a later time than the former one.

Second, assume the two users target two devices (such as speaking to two devices respectively) by a voice command alone or a voice command plus a gaze act within a given short period of time, say a few seconds. The two devices may communicate with each other or communicate with a control system respectively. If the two users give the same task, like turning on the same television, the task may be implemented. If the two users give different tasks, there are two cases. If the two tasks could be performed simultaneously without conflicting with each other, like turning on two separate user systems, the two tasks may be carried out at the same time. If the two tasks conflict with each other, like turning on the lights and turning off the lights at the same room, a task whose corresponding voice command ends last may prevail. For instance, a switching apparatus or control system may receive two signals or commands from the two devices. If one means turning on the lights and the other means turning off the lights, the switching apparatus or control system may turn off the lights if it gets info that voice messages of the latter command end at a later time than voice messages of the former command.

Sometimes, a device is designed to receive voice commands and send signals to control another device. The former and latter devices may be called a control and application device. For instance, examples of application devices may include a television, a radio, an air conditioning, lights, etc. A control device may receive a verbal command from a user and detect the user's gaze and gesture input. Word "gesture", as used herein, may mean gestures a user makes using hand, finger, head, or other body parts. When a user says "ABW, turn on TV", ABW and TV are names of a control and application device respectively. The exemplary command asks the control device to switch on the television. To make it simpler, the user may omit the names. For instance, the user may just say "Turn it on". The situation is reflected by a graphic illustration shown in FIG. 5. A user 42 says "Turn it on" while gazing at a control device 44 and pointing at an application device 40, e.g., a television. Device 44 receives the voice command via one or more microphones and speech recognition techniques. Device 44 also has a gaze sensor that determines which direction user 42 gazes at. When the user gazes at device 44, it may mean that the voice command is addressed to device 44. Meanwhile, device 44 ascertains whether user 42 makes any predefined gestures via a gesture sensor. The gesture sensor detects gestures via mature image recognition and analysis. When the user gestures at device 40, e.g., extending a hand to point at device 40, it may mean device 40 is the application device. Next device 44 combines information collected from speech recognition, the gaze sensor, and the gesture sensor to conclude that user 42 wants device 44 to turn on device 40. Then, device 44 sends signals or instructions to device 40. The signals or instructions cause device 40 to perform the task. Hence execution of the task is performed at device 40, i.e., power is switched on.

Thus, a control device may contain a voice recognition system, a gaze sensor, and a gesture sensor. After receiving a verbal command, the control device may ascertain a user via speech recognition, gaze sensing, and gesture sensing. The combined detection results may reveal contents of a task, a control device the verbal command is addressed to, and an application device at which the task will be implemented. In addition, the control device may have positioning capabilities to locate a user using either sound waves as discussed above or by analyzing images taken by a camera. For instance, after receiving a voice command, the device may find the user by calculating a source of the voice or identifying a person by image analysis, image recognition, or pattern recognition. Position of a speaker is important when there are multiple users. Once the position is known, the speaker may be identified. Consequently, gaze and gesture info from other users may be omitted.

A control device is configured to receive voice, gaze, and gesture instructions from users. The device should be placed at a location where it has a clear view of a user. Alternatively, a control device may have wheels and be able to move around autonomously. For instance, it may be designed that a control device may sense where a user is in a preset range or in a preset area. As aforementioned, a user's position may be obtained by analyzing sound waves or images. Detection of a user may be triggered by voice signals or based on a preset schedule. If views of the user are not clear enough as a result of blocking or partial blocking, the device may calculate a route via certain algorithm, move to another location autonomously, check views of the user, and stay there waiting for instructions from the user if the views become clear. Optionally, a control device may measure the distance between it and the user. If the distance is larger than a given value, it may affect gaze detection and/or voice recognition. Thus the device may calculate a route and get closer to the user when the distance is beyond the given value. When the user is outside the preset range or area, the device may return to a predetermined place after a given time period.

To avoid interference with a user's activities, a control device may be arranged to stay within a given area and keep a minimum distance from the user. A user may also ask a control device to come closer to him or her by saying commands like "ABW, come closer" or "ABW, come here". Then the device may calculate a route and move to a place which is closer to the user. Optionally, a control device may be installed on a drone which may fly autonomously within a given range. Several landing areas may be arranged for the drone. A user may let the drone record the landing areas via given procedures. A movable control device may also charge itself autonomously when needed. Additionally, facial recognition or other recognition techniques may be employed such that a movable control device only follows a predefined user.

As another alternative, multiple control devices may be placed at respective locations in a target area, such as in a room. If the view of a user is blocked for one device, the view may be clear for another device. The control devices may be connected wirelessly, communicate with each other, and share detection results. The devices may also report to and be managed by a master device which makes decisions and send out instructions to application devices.

FIG. 6 shows an exemplary timeline which illustrates how a voice command is taken and implemented by a control device in two scenarios. The control device and an application device may be called Name 1 and Name 2. The control device detects verbal and gaze input from a user. At the beginning, such as at Time 1, the control device detects a voice command from the user. The command contains a task to be done. The control device ascertains whether the command includes any preset device names. The user may utter a name or choose not to say it. For instance, the user may say "ABW, turn on the lights" or "Turn on the lights". The former example includes names of a control and application device, while the latter only has a name of the application device. In the first scenario of the figure, the command contains a task and names of the control and application device. It is clear the user wants the control device to do the task at the application device. Then at Time 2, the task is performed. In the second scenario, the command contains a task and the name of the application device. And it is detected that the user looks in a direction toward the control device. Hence, it also means the user wants the control device to do the task at the application device. Then the control device sends signals to the application device and causes the application device to do the task at Time 2. The user may gaze at the control device before, during, or after a time period when the voice command is uttered.

FIG. 7 shows an exemplary timeline which illustrates how a voice command is taken when both gaze and gesture input are involved. In the figure, Device 1 is a control device and called Name 1. Device 2 an application device and called Name 2. Assume that the control device detects verbal, gaze, and gesture input. Alternatively, the verbal, gaze, and gesture input may also be sensed by one or more other detectors which are configured at the place. At the beginning, i.e., at Time 1, the control device receives a voice command from a user. The command contains a task to be performed. For all cases, the user may gaze at the control device before, during, or after a time period when the voice command is uttered. The user may utter one or both names of the devices or choose not to mention them.

Scenario 1: The voice command contains Name 1, Name 2, and a task, i.e., it includes names of the control and application devices and a task to be performed. Assume that the command is "ABW, turn on the heater", where ABW and heater are the names of the two devices and "turn on the heater" is the task. Consequently, the control device interprets the voice command using speech recognition mechanisms, obtains the names and the task, sends signals to the heater, and causes the heater to do the task. Then the heater is turned on at Time 3.

Scenario 2: The voice command contains Name 1 and a task, i.e., it includes the name of the control device and a task to be performed. Assume that the command is "ABW, turn it on", where ABW is the name of the control device and "turn it on" is the task. The control device interprets the command, obtains its own name, finds the user by aforementioned sound origin and/or image analysis method, and ascertains the gaze direction and/or gesture of the user. At Time 2, it is detected that the user gazes or uses a hand or finger to point at the application device. Then at Time 3, the control device switches on the application device.

Scenario 3: The voice command contains Name 2 and a task, i.e., it includes the name of the application device and a task to be performed. Assume that the command is "Turn on the heater", where heater is the name of the application device and "turn on the heater" is the task. The control device interprets the command, obtains the name of the application device, finds the user by aforementioned sound origin and/or image analysis method, and ascertains the gaze direction of the user. At Time 2, it is detected that the user gazes at the control device, meaning that the control device should execute the command. Then at Time 3, the control device switches on the heater.

Scenario 4: The command only contains a task, such as "Turn it on". The control device interprets the command, finds the user by aforementioned sound origin and/or image analysis method, and ascertains the gaze direction and gesture of the user. At Time 2, it is detected that the user gazes at the control device and points at the application device using a hand or finger, meaning that the control device should turn on the application device. Then at Time 3, the control device switches on the application device.

As some users may not like to be monitored by a control device constantly, the device may be configured to listen to and watch a user only in limited occasions. For instance, a device may listen to a user's utterance only after the user says the name of the control device or says a preset command. If the utterance doesn't begin with the name or a preset command, the device may stop listening (receiving or interpreting voice input) until a given time period elapses during which no utterance is detected. The given time period may be few seconds, for instance.

To let a user aware what a control device is doing, two buttons may be configured on it. For instance, one button may be lightened when the device is listening, i.e., it is taking voice input. The other button may be lightened when the device is watching, i.e., it is detecting a gaze direction and/or gestures of a user.

FIGS. 8-A and 8-B are exemplary diagrams showing a user issues a command inside a vehicle 46 according to the present invention. Vehicle 46 may represent an autonomous vehicle (also known as a driverless or self-driving vehicle). Vehicle 46 may include a vehicle control system (not shown) and a driving system (not shown) responsible for vehicle navigation and driving respectively. The control system may include a processor and a computer readable medium. The processor may run programs or sets of executable instructions stored in the computer readable medium for performing various functions and tasks, e.g., receiving and processing data collected from sensors, retrieving map data from the medium, sending driving signals to the driving system, communicating with service center, executing other applications, etc. The control system may also include input, output, and communication components.

In addition, the control system may have a display (not shown) and a graphical user interface (GUI). The display may serve as the main display of the control system and the interface may be used to show vehicle status, destination, current driving route, and certain options. The user may use the interface to review a command issued, search and retrieve information, view surrounding area maps, interact with the control system, and so on. The driving system may comprise a speed module, a steering module, a braking module, etc. for implementing driving maneuvers which are determined by the control system.

Vehicle 46 may also include various sensors (not shown) such as cameras, microphones, a radar system, a light detection and ranging (LIDAR) system, a GPS device, a speed sensor, an accelerometer, an electronic compass, a suspension sensor, etc.

As shown in FIG. 8-A, vehicle 46 may have two seats 48 and 50 and the user sits on seat 48. After getting in the vehicle, the user utters "Gym". The voice input of the user may be received by one or more microphones and analyzed by a voice recognition system (not shown). As the voice input doesn't have an address, name of a place, or a name of a business, the control system may not be able to determine the user's command via a traditional method. As the user may be identified by facial recognition, an ID card that may be scanned, or a preset code, the control system may send the ID information to service center and retrieve user information from there. The retrieved information may include the user's past riding events, a summary based on the past rides, and/or certain daily or monthly patterns created based on the user's ride records. The ride records may contain past trips of the user, such as past start places and destinations. The user information may show that the user often go to a local gym. Hence, the control system may determine that the voice input "Gym" indicates the user wants to go the local gym. As such a user may issue a verbal command that is simple, convenient, and natural without saying a complete address or a formal name.

In FIG. 8-B, a user sits on seat 48 inside vehicle 46. The control system of vehicle 46 may use cameras (not shown) and microphones (not shown) to monitor the user, receive a voice input "Go there", and a gesture pointing to a direction. The user may use finger and or hand to make gestures. As the phrase "Go there" does not contain any destination, a name of a place, or a name of a business, traditional techniques may not be able to determine where that use wants to go. Since the control system detects that the user gestures or points at a direction, the direction may be determined as a direction the vehicle shall drive along. In some embodiments, the control system may send instructions to the driving system to drive vehicle 46 along the direction, if there is no additional information about the user's records. In some other embodiments, the control system may identify the user and retrieve user information from service center. The user information may indicate that the user often goes a place in that direction. Then, the control system may show the place on a screen as the destination for the user to review. If the user responds positively like saying yes or doesn't respond, it may be considered that the destination is confirmed. Images of the user may be taken by a camera, and gestures may be recognized in the images and analyzed by the control system using mature techniques.

FIG. 9 is a schematic flow diagram showing one embodiment of determining a user command via a user input and user information. The user input may include a voice input and/or a gesture. The user information may include information about the user that is collected in the past. At step 128, a user is detected inside a vehicle by a control system of the vehicle and then the user may be identified at step 130 by a facial recognition process, a communication between a device of the user and the control system, an ID card scanning process, or another suitable method. At step 132, the control system may send a request message to service center to retrieve the user information. Service center, as a service facility, may have a database that stores records, analysis, and data about users. Meanwhile, the control system keeps monitoring the user via cameras and microphones to detect any voice input and gestures. After receiving a voice input and/or a gesture, the control system may determine a command. If the user input contains an address, a name of a place or a business, the control system may arrange the driving system to drive the vehicle to a corresponding destination. If the user input does not contain an address, a name of a place or a business, information retrieved from service center may be utilized to determine a destination for the user based on the user input and user information at step 134.

FIG. 10 is another schematic flow diagram showing one embodiment of determining a user command via a user input and user information according to the present invention. At step 136, a control system of an autonomous vehicle detects a user inside the vehicle and may start monitoring the user via sensors such as cameras and microphones. At step 138, the user may be identified by an identification technique such as facial recognition, finger print, recognizing a personal device (e.g., smartphone of a user, smart watch of a user), or verifying a preset code. At step 140, the control system may determine whether destination information is obtained. The destination may be submitted by the user via prearrangement, a verbal input, or keying-in at a key pad. If the control system receives a complete address, a name of a place, or a name of a business, the destination may be displayed on a display inside the vehicle at step 148 and the vehicle may navigate to the destination autonomously at step 150. If the control system does not receive a complete address, a name of a place or a business, step 142, 144, or 146 may be performed, and user information retrieved from service center may be utilized to determine a destination for the user. A complete address may mean information including a street name, a street number, and a city name. In many cases, a street name and a street number may be enough to identify a location precisely when there is only one street with such street name in the area. The word "address", as used hereinafter, may mean a complete address unless being specified otherwise.

In some embodiments, a user input may not contain an address, a name of a place, or a name of a business, but may be used to derive the address information by the control system. Hence, step 140 may also be arranged as a step to determine whether an address, a name of a place, or a name of a business may be obtained or derived from a user input without using data retrieved from the user's records.

In some embodiments, a name of a place may also include a name of a business, if the name of the business stands for a specific place. For example, if a popular store has only one location in an area, the store name may equal the location, i.e., going to the store equaling to going to the location.

As aforementioned, the user information may include the user's records collected in the past. In some embodiments, the user information is retrieved after the user is identified. In some other embodiments, the user information is retrieved only when the user input does not contain adequate destination information.

A voice input may be recognized by a voice recognition technique that is mature, available, and widely used nowadays. At step 142, a voice input does not contain an address. Instead, it may include category information about a business. For example, a user may say "Gym", "Grocery", or "Dry cleaning", instead of a business name. For example, when a user says "Gym", the control system may find out that the user often goes to "First Gym". As such, the control system may select "First Gym" as the destination and display "First Gym" on a screen of the vehicle for the user to review and confirm. Hence, a user does not need to utter a full name of a business when submitting a verbal command.

In some embodiments, a user may also utter a product name of a business. For example, a user may say "Pizza", "Coffee", "Paint", etc, instead of a name of a business. When a user says "Coffee", the control system may find out that the user often goes to "Café Special" from the user information obtained at service center. As such, the control system may select "Café Special" as the destination and display "Café Special" on a screen of vehicle 46.

In some embodiments, a user may also utter a name of a service that is provided by a business. For example, a user may say "Car wash" or "Hair cut", instead of a name of a business. When a user says "Hair cut", the control system may find out that the user regularly goes to "Wendy's Hair Style". As such, the control system may select "Wendy's Hair Style" as the destination and display "Wendy's Hair Style" on a screen of the vehicle 46.

In some embodiments, a user may preset a word and use it to represent a business or place. For example, a user may select a phrase "My cup" and use it to represent a coffee shop, which may be done after the user logs in his or her account. The user information may include the phrase. Hence, when the user is identified and the user says "my cup", the control system may find a corresponding business. As such, the control system may select the coffee shop as the destination and display the business on a screen of the vehicle.

In some embodiments, service center may identify and record a word or a short phrase that a user often uses when says a business or place. For example, a user may like to say "Café Special the coffee corner". When the user omits the business name and just says "coffee corner", the control system may find the corresponding business, as coffee corner has become a key word with a specific entity. As such, the control system may select "Café Special" as the destination and display the business on a screen of the vehicle for the user to review and confirm.

In some embodiments, a user may also utter a word that matches an event in records. For example, a user may say "Golf" or "Hiking", instead of a name of a place. When a user says "hiking", the control system may find out that the user regularly takes a ride to go to a park that has a hiking trail. As such, the control system may select the park as the destination and display a name of the park on a screen of the vehicle for the user to review and confirm.

In some embodiments, a user may also utter an incomplete address. For example, a complete address may be 1645 Palm Tree Street. However, a user may just say "1645", "Palm Tree", or "Palm Tree Street". Next, the control system may find out that the user had taken several rides to 1645 Palm Tree Street in the past. As such, the control system may select the place as the destination and display the address on a screen of the vehicle for the user to review and confirm. As an incomplete address means less work for a user, it may be desirable.

Hence, multiple options are provided for a user to issue a voice command that is simple, convenient, and natural.

At step 144, the control system obtains a gesture made by the user but doesn't receive any voice input. The control system may detect which direction the user gestures at using a hand and/or a finger. The control system may retrieve map data of a corresponding map, get orientation data of the vehicle via an electronic compass, and determine the orientation of the user in a the geographic coordinate system. Then images of the user may be analyzed and a direction the user gestures at may be determined. Next, the control system may determine a business along the pointed direction. The business may correspond to a business mentioned in the user's records. If there are multiple businesses that correspond to information in the records, the control system may select a business which better fits the time of the day. For example, the user may often visit a business at the time of the day. As such, the control system may select the business as the destination and display a name of the business on a screen of the vehicle. If the user does not agree, the user may respond by uttering a command or key in a name.

In some embodiment, a control system may not detect any user input from a user. For example, a user may get in a vehicle, take a seat, and not say anything, not say anything related to a destination, or make any gesture. After the user is identified, the control system may retrieve user information or records of the user from service center. Based on the user information, the control system may determine a place as the destination, as the user regularly goes to the place at the time of the day. Then, the control system may display the place on a screen of the vehicle for the user to review and confirm. Hence, a user does not need to say or gesture anything after getting in the vehicle and the control system may determine a destination based on the time and the user's records, which applies to scenarios when the control system doesn't detect any user input which contains destination information or may be analyzed to derive any destination information.

At step 146, the control system obtains a voice input and a gesture. For example, when the user says "Coffee", there may be multiple qualified coffee shops which the user frequently visits. If the control system detects that user gestures at a direction, a qualified coffee shop that is located in the direction may be selected by the control system as the destination.

At step 148, the control system displays a name of a place, a business, or an event for the user to review and confirm. If there is no response, it is considered that the user has no issue with the selected place or business. Then at step 150, the control system starts driving the vehicle to the destination.

CONCLUSION, RAMIFICATIONS, AND SCOPE

Thus it can be seen that systems and methods are introduced to present location related information.

The improved method and system have the following features and advantages:
(1). Location related info may be brought out by simply gazing at a screen of a device;
(2). A gaze sensor of a device may be turned on by a location-based signal or a shaking act of a user;
(3). A task may be implemented based on voice and gaze input;
(4). A device may be addressed by a name, a gazing act, a hand gesture, or a finger gesture;
(5). A task involving two devices may be implemented based on voice, gaze, and gesture input; and
(6). A user command in a vehicle may be determined based a voice input, a gesture, and/or a user's past records.

Although the description above contains many specificities, these should not be construed as limiting the scope of the invention but as merely providing illustrations of some of the presently preferred embodiments. Numerous modifications will be obvious to those skilled in the art.
Ramifications:

Ambient light sensor may be added to a device which may be used to sense ambient light intensity to determine whether the device is in a pocket or bag. If a device is not pulled out, act of shaking, tapping or knocking may be ignored in applications discussed in the above.

Furthermore, a device may be equipped with a facial recognition system or other suitable recognition systems. The system may at least recognize a device owner, which may protect user privacy by not following other people's instructions. It may be configured that a user is authenticated by a given recognition method when a voice input is taken from the user. The system may make use of eye-tracking camera and employ facial sensing algorithm to identify a user.

In several examples in the above, shaking is used to illustrate various embodiments. It is noted that other forms of user input, such as rotating, tilting, tapping, knocking, or touching may also be employed to perform the same function. Still other methods for a user to interact with a device besides shaking include sliding on a touch screen or touch pad, or opening a lid of a device.

If a user's identity is known, info presented may be selected based on not only the location of the user, but also his or her past experience, or based on a user's experience only when it is worthwhile to do so. For instance, when a user is travelling, he or she may have more free time, which provides a good chance for presenting certain info, like commercials. Although advertisement presented may be unrelated to a location, since it may fit the interest or need of the user, it may be relevant, and thus effective. Thus, contents presented on a device after the device is waked up from a standby state may be location related or arranged at a remote or nearby facility according to a user's records and analysis on the user.

In addition, it may be arranged such that a user may decide what to present on screen. For instance, a user may choose a program for update on news, instant messages, or a social networking group. When there isn't any suitable location related info or other prearranged info from a service, a device may display contents preselected by a user after the device received a signal and appropriate user input. Options may also be configured such that a user may select either to present location related info prepared by a service or present certain info or program prearranged by a user. In practice, buttons "Location-Related Info" and "Self-Selection" may be configured on screen during a presentation period. The buttons may correspond to presentation of location-based info and self-selected info respectively. A user may switch between showing different information by tapping or clicking on the buttons.

Thus, a gazing act may be used to display info which is related to a user's location, records, or self-selection. It is noted that info on display or to be displayed may be any which is arranged by a system, a service, or a user, or may be any which is not related to contents shown on screen before a device got into a standby mode. In other words, it may be arranged such that a gazing act or shaking plus gazing act causes presentation of contents which are specifically arranged and are unrelated to information presented before standby state.

The schemes illustrated in FIGS. 2, 3, and 4 may be combined in many ways. For example, sorting info by the pointing function may be applied to all cases. On-screen buttons may be arranged for turning on and off the sorting function. So a user may choose options to turn on or off the sorting mode any time.

For convenience and better user experience, after a user arrives at a place and the user's device receives location related data, the device may beep to signal that some info is available to watch. Meanwhile, if the device is on standby, a small window may appear to post a short notice. Thus, a user may easily know there is something available and then may gaze at the screen or notice window to invoke a presentation or shake the device and then gaze at it to cause info presentation.

For a qualified gaze at a display, a user's sight may also fall on things located outside the display but close to its edge, instead of areas on the display only. The reason is that, when a user looks at objects close to a display, certain content shown on it may also reach the user's eye, thus providing a viewing opportunity anyway. Hopefully, the user may turn his or her sight a bit to get a better reception of the content. Moreover in many cases, instead of a display of a device, it may be good enough to qualify as a gaze at a display if a user just looks at a direction toward the device, because it means a user may have intention to watch a presentation on it, and the user may have a good chance to notice some content items displayed on the device anyway. In cases of smartphone and tablet computer, gazing at a device is almost equivalent to gazing at a display, because for these devices, a display may cover the whole area of one side.

When a device can't detect a user's gaze direction, it may sense the user's gesture and use gesture results to replace the gaze direction. For instance, when a device detects a verbal command from a user and the user's finger is pointed at the device, the device is arranged to implement the command. In aforementioned embodiments or examples, the gazing act or gazing condition may be replaced by a gesturing act. It is noted a user may use two hands to point at two devices simultaneously or in sequence. For instance, a user may utter a command which contains no name and use two hands to point at a control and application device. When the control device detects the gestures, it may take the command and cause execution of the task at the application device. Alternatively, the user may also use one hand to point at the control and application device separately and consecutively. The user may point at the application device first and then the control device as well.

When a user points at a device while saying a name of another device, the pointing gesture prevails. Thus the other device will not be involved in a pending task.

To make a command simple and brief, a control device may record previous data and do it like last time or restore a previous setting in a predefined way. Hence, a user may not need to utter a task and give sufficient information in select cases. Certain mechanisms may be configured for such a purpose. After a control device receives a task, it may check whether it obtains sufficient information. For instance, if a task is about turning on a television, task info is incomplete when a user doesn't specify a channel number. In such a case, the device may retrieve data of such a task in the past. The data may include setting values, conditions, and other info about the task. For instance, when a user utters "ABW, turn on the air conditioning" without saying what degree the temperature should be, ABW, a control device, may retrieve temperature setting values in a similar time frame in the previous day. If the time is 2:00 pm and the temperature was set at 70 degrees Fahrenheit at 2:00 pm the previous day, the control device may use 70 degrees Fahrenheit and send it to the AC as a setting value. When a user says "ABW, turn on the TV", again, the control device finds the task info is incomplete. Then it may check the records. If the time is 11:00 am on Saturday and the user watched channel 9 around 11:00 am on the past three Saturdays, the control device may decide that channel 9 is the best choice and switch to the channel autonomously.

After a control device receives a command about a task, it may check whether the task contains sufficient information for its implementation. When a task has sufficient info, the control device executes the task following instructions. If the task has incomplete or insufficient information, the control device may check whether the task is in a list of select items. If it is in the list, there may be a daily pattern, weekly patter, and summaries. A daily pattern may mean one or more values are associated with a time frame in a day recently, like in the past one to three weeks. A weekly pattern may mean one or more values are associated with a time in a week recently, like in the past two to four weeks. If the control device obtains a daily or weekly pattern, it may follow the pattern and create the needed data autonomously, like the AC and television examples discussed above. When a pattern is not found, the control device may retrieve a summary of select data which was collected in the past. For instance, if a user visited a shopping website more than other shopping sites in a given time period, an address of the shopping website may be recorded. Assume that a user says "Go shopping" and then gazes at a control device while pointing at a computer screen. The control device recognizes the command and finds it has incomplete info, since the user didn't say a place or an internet site for shopping. Then the control device detects that the task is in the list and starts checking whether there are any patterns or summaries of past activities. Next, the shopping website is found from one of the summaries. Consequently, the control device sends the website address to the computer and causes it to log on the website and present a webpage.

Besides insufficient task info discussed above, a user may also omit an application device when issuing a voice command. For instance, a user may utter "Do it" to a control device while looking at it but doesn't say, gaze, or point at an application device. The user may also just say "ABW, do it" without giving other input. After receiving the voice and/or gaze input, a control device checks it and identifies the missing info, which includes additional task information and an application device. If there is only one application device, the control device may check daily and weekly patterns and summaries of the application device to obtain a suitable task. Then the control device sends signals to the application device to cause it to execute the task. If there are multiple application devices, the control device has to select one among them autonomously. It may check records of the present application devices, and retrieve their daily and weekly patterns and summaries to get the best result. For instance, if the user keeps doing a task at an application device in the present time frame daily or weekly, the control device may send instructions to the application device and let it do the task. Moreover, the control device may obtain data that indicates the user was engaged in multiple tasks at multiple application devices in the present time frame daily or weekly. Then the control device may communicate with the corresponding devices and cause them to perform the tasks respectively. Thus, when a user issues a command with insufficient info, a control device may check the records, identify one or more tasks and one or more application devices, and implement the one or more tasks at the one or more devices. The method makes it simple and convenient for a user to issue one or more commands.

Lastly, a method may be configured which ascertains whether a user faces a device, instead of gazing at a device. In some applications, it may be difficult to sense a user's eye movement, due to technical issues or ambient lighting conditions. Thus it may be arranged to detect whether a user faces a device. For instance, a device may use an imaging sensor like camera to take pictures or videos of a user. Certain algorithm may be used to identify facial features of the user, determine positions of the user's eyes, and then calculate a distance between a spot of the device and one eye and another distance between the spot and the other eye. The spot may be a point at the center of the device or the center of an output component. If difference of the two distances is smaller than a given value, it may be considered that the device is right in front of the user or the user faces the device. Consequently, it may be configured that in all of above discussions, gazing requirement may be replaced by facing requirement when a user or entity decides to do so. For instance, a requirement of gazing at a device may become a requirement of facing a device.

Therefore the scope of the invention should be determined by the appended claims and their legal equivalents, rather than by the examples given.

The invention claimed is:

1. A method performed for determining a command inside an autonomous vehicle, comprising:
   1) monitoring a user after the user gets in the autonomous vehicle using a plurality of sensors including a camera and a microphone by a control system, the control system including a processor;
   2) identifying the user using an identification technique;
   3) detecting a voice input from the user using a voice recognition technique;
   4) determining whether the voice input includes an address or a name of a place;
   5) when the voice input includes an address or a name of a place, determining a destination based on the voice input;
   6) when the voice input does not include an address or a name of a place, retrieving information from a service facility about the user based on the user identification, and determining a destination based on the voice input and the retrieved information about the user, including names of previous destinations of the user; and
   7) driving the autonomous vehicle toward the destination autonomously after the destination is determined.

2. The method according to claim 1 further including detecting a gesture of the user and determining a destination based on the voice input, the gesture, and the information about the user when the voice input does not include an address or a name of a place.

3. The method according to claim 1, wherein the voice input includes category information about a business.

4. The method according to claim 1, wherein the voice input includes a product name of a business.

5. The method according to claim 1, wherein the voice input includes a name of a service that is provided by a business.

6. The method according to claim 1, wherein the voice input includes a word prearranged by a user.

7. The method according to claim 1, wherein the voice input includes a word that matches an event in records.

8. A method performed for determining a command inside an autonomous vehicle, comprising:
   1) monitoring a user after the user gets in the autonomous vehicle using a plurality of sensors including a camera and a microphone by a control system, the control system including a processor;
   2) identifying the user using an identification technique;
   3) detecting a gesture of the user and detecting a voice input from the user using a voice recognition technique;
   4) determining whether the voice input includes an address or a name of a place;
   5) when the voice input includes an address or a name of a place, determining a destination based on the voice input;
   6) when the voice input does not include an address or a name of a place, determining a destination based on the gesture, the voice input, and information about the user, the information retrieved from a service facility and including names of previous destinations of the user; and
   7) driving the autonomous vehicle toward the destination autonomously after the destination is determined.

9. The method according to claim 8 further including detecting that the gesture points to a direction and determining a destination based the direction, the voice input, and the information about the user when the voice input does not include an address or a name of a place.

10. The method according to claim 8, wherein the voice input includes category information about a business.

11. The method according to claim 8, wherein the voice input includes a product name of a business.

12. The method according to claim 8, wherein the voice input includes a name of a service that is provided by a business.

13. The method according to claim 8, wherein the voice input includes a word prearranged by a user.

14. The method according to claim 8, wherein the voice input includes a word that matches an event in records.

15. A method performed for determining a command inside an autonomous vehicle, comprising:

1) monitoring a user after the user gets in the autonomous vehicle using a plurality of sensors including a camera and a microphone by a control system, the control system including a processor;
2) identifying the user using an identification technique;
3) detecting a gesture of the user and a direction the gesture points at;
4) determining a destination based on the direction the gesture points at and information about the user, wherein the information is retrieved from a service facility and includes a name of a previous destination of the user, and the direction the gesture points at extends toward the previous destination; and
5) driving the autonomous vehicle toward the destination autonomously.

16. The method according to claim 15 further including detecting a voice input from the user using a voice recognition technique.

17. The method according to claim 16, further including determining a destination based on the direction, the voice input, and the information about the user.

18. The method according to claim 17, wherein the voice input includes a product name of a business.

19. The method according to claim 17, wherein the voice input includes a name of a service that is provided by a business.

20. The method according to claim 17, wherein the voice input includes a word that matches an event in records.

* * * * *